(12) United States Patent
Terada et al.

(10) Patent No.: US 8,574,780 B2
(45) Date of Patent: Nov. 5, 2013

(54) FUEL CELL SEPARATOR WITH CHROMIUM RICH SURFACE LAYER AND METHOD OF PRODUCING THE FUEL CELL SEPARATOR

(75) Inventors: Satoru Terada, Utsunomiya (JP); Daisuke Okonogi, Tochigi-ken (JP); Takahiro Takai, Utsunomiya (JP); Masao Utsunomiya, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 792 days.

(21) Appl. No.: 12/177,663

(22) Filed: Jul. 22, 2008

(65) Prior Publication Data
US 2009/0035643 A1  Feb. 5, 2009

(30) Foreign Application Priority Data
Aug. 3, 2007  (JP) ................ 2007-203302

(51) Int. Cl.
*H01M 2/38* (2006.01)
*H01M 2/40* (2006.01)
*C25F 3/06* (2006.01)

(52) U.S. Cl.
USPC ........... 429/457; 429/452; 429/468; 205/704; 205/705; 205/717

(58) Field of Classification Search
USPC ........... 429/35, 452, 457, 468; 205/704, 705, 205/717
See application file for complete search history.

(56) References Cited

U.S. PATENT DOCUMENTS

| | | |
|---|---|---|
| 2003/0116536 A1 | 6/2003 | Ohtani et al. |
| 2003/0170523 A1 | 9/2003 | Miyano et al. |
| 2004/0137304 A1 | 7/2004 | Tanaka et al. |
| 2005/0045250 A1 | 3/2005 | Rakowski |
| 2006/0105218 A1* | 5/2006 | Ishikawa et al. ............... 429/34 |
| 2009/0130535 A1 | 5/2009 | Miyano et al. |

FOREIGN PATENT DOCUMENTS

| | | |
|---|---|---|
| EP | 1227531 A1 | 7/2002 |
| GB | 2385332 A | 8/2003 |
| JP | 2002-83616 A | 3/2002 |
| JP | 2004-149920 A | 5/2004 |
| JP | 2004-207071 A | 7/2004 |

(Continued)

OTHER PUBLICATIONS

European Search Report dated Oct. 17, 2008, issued in corresponding European Patent Application No. 08012773.1.

(Continued)

*Primary Examiner* — Sean P Cullen
(74) *Attorney, Agent, or Firm* — Westerman, Hattori, Daniels & Adrian, LLP

(57) ABSTRACT

The present invention relates to a fuel cell separator and a method of producing the fuel cell separator. A first separator and a second separator are provided as the fuel cell separators. Firstly, the first separator and the second separator are heated. Thus, an Fe rich layer is formed in a surface layer of each of the first separator and the second separator, and a Cr rich layer where a proportion of Cr is 60% or more is formed in an inner portion of each of the first separator and the second separator. Then, an electrolytic treatment is applied to each of the first separator and the second separator to remove the Fe rich layer. By the removal, the Cr rich layer is exposed to the outside on the outermost surface layer of each of the first separator and the second separator.

2 Claims, 3 Drawing Sheets

(56) References Cited

FOREIGN PATENT DOCUMENTS

| | | |
|---|---|---|
| JP | 2005-222764 A | 8/2005 |
| JP | 2006-206616 A | 8/2006 |
| WO | 02/13300 A1 | 2/2002 |
| WO | 02/23654 A1 | 3/2002 |
| WO | 2005/041332 A2 | 5/2005 |

OTHER PUBLICATIONS

Japanese Office Action dated Sep. 15, 2009, issued in corresponding Japanese Patent Application No. 2007-203302.

* cited by examiner

FIG. 3

| No. | PROPORTION OF Cr | EVALUATION OF IMPREGNATION TEST | EVALUATION OF BLISTER RESISTANCE |
|---|---|---|---|
| 1 | 0.5 | × | × |
| 2 | 0.55 | × | × |
| 3 | 0.6 | △ | △ |
| 4 | 0.65 | △ | △ |
| 5 | 0.7 | ○ | ○ |
| 6 | 0.75 | ○ | ○ |
| 7 | 0.8 | ○ | ○ |
| 8 | 0.85 | ○ | ○ |
| 9 | 0.9 | ○ | ○ |

FUEL CELL SEPARATOR WITH CHROMIUM RICH SURFACE LAYER AND METHOD OF PRODUCING THE FUEL CELL SEPARATOR

BACKGROUND OF THE INVENTION

1. Field of the Invention

The present invention relates to a fuel cell separator used in combination with an electrolyte electrode assembly to form a unit cell of a fuel cell and a method of producing the fuel cell separator.

2. Description of the Related Art

In general, a fuel cell includes unit cells each formed by sandwiching an electrolyte electrode assembly between a pair of separators. In the unit cell having this structure, seals are formed at edges on both surfaces of the separators (e.g., see Japanese Laid-Open Patent Publication No. 2004-207071). In operation of the fuel cell, a fuel gas containing hydrogen is supplied to the anode of the electrolyte electrode assembly, and an oxygen-containing gas is supplied to the cathode of the electrolyte electrode assembly. The seals are used to prevent leakages of the fuel gas and the oxygen-containing gas to the outside of the fuel cell.

Further, as described in Japanese Laid-Open Patent Publication No. 2005-222764, the seals may be provided around a coolant flow field as a passage of a coolant. Further, the seals may be provided around an oxygen-containing gas flow field as a passage of the humidified oxygen-containing gas and a fuel gas flow field as a passage of the humidified fuel gas. The seals are provided because condensation may occur in the oxygen-containing gas or the fuel gas, and water produced in the power generation operation of the fuel cell may be retained in the oxygen-containing gas flow field or the fuel gas flow field. It is a matter of course that the seals may be provided for all of the coolant flow field, the oxygen-containing gas flow field, and the fuel gas flow field.

As the seals (seal composition) of this type, silicone resin is adopted widely. The silicone resin has good elasticity, and easily absorbs expansion/contraction of the stack during operation of the fuel cell, or when operation of the fuel cell is stopped. Further, since the elasticity of the silicone resin is maintained even at the temperature below the freezing point, it is possible to prevent leakage of the reactant gases even in a cold region or the like. Therefore, the silicone resin can be used suitably for fuel cells in automobile applications.

However, the acid resistance of the silicone resin may not be sufficient in some applications. In general, the electrolyte membrane of the electrolyte electrode assembly has high acidity. Therefore, the silicone resin adjacent to the electrolyte membrane may be degraded, and the elasticity may be lowered undesirably. Likewise, since the primer provided between the silicone resin and the separator to adhere the silicone resin to the separator is degraded by the acid, the seal may be peeled off from the separator undesirably.

In this regard, in a proposed technique disclosed in Japanese Laid-Open Patent Publication No. 2002-083616, cross-linking reaction between predetermined liquids is induced to obtain a fuel cell packing material (seal) which is made of addition type silicone having good acid resistance. Further, in a proposed technique disclosed in Japanese Laid-Open Patent Publication No. 2006-206616, acid resistance is improved using resol-type phenolic resin and primer compound containing organic compound having a chelate ring and/or an alkoxyl group.

In operating the fuel cell, the temperature of the fuel cell is raised to a predetermined operating temperature. Then, as known in the art, by operation of the fuel cell, $H_2O$ (chiefly water vapor) is produced. This $H_2O$ is discharged from the flow field together with the fuel gas consumed at the anode or the oxygen-containing gas consumed at the cathode.

As can be seen from the above, hot and highly humid gases contact the fuel cell seal. Though the silicone rubber has sufficient gas sealing performance for preventing leakages of the fuel gas and the oxygen-containing gas, the gas permeability of the silicone rubber is large in comparison with the Fluoro Rubber or the EPDM (ethylene propylene diene monomer) rubber. Since the silicone rubber has water repellency, the water permeability of the silicone rubber is extremely small. Therefore, in the case where the primer is made of the silicone rubber, the water vapor (gas) passes through the silicone rubber, and the water vapor is condensed into the liquid state at the interface between the silicone rubber and the separator. In this case, blisters may be formed undesirably. If the blisters are formed near the flow field, the sectional area of the flow field is reduced, and pressure losses occur undesirably.

Thus, it is desired to sufficiently prevent formation of blisters in the fuel cell seal. However, in the conventional techniques as noted above, it is difficult to reliably prevent formation of blisters.

SUMMARY OF THE INVENTION

A general object of the present invention is to provide a fuel cell separator in which seals are firmly bonded to the separator, and the seals are not separated from the separator easily.

A main object of the present invention is to provide a fuel cell separator which makes it possible to prevent formation of blisters between the seal and the separator.

Another object of the present invention is to obtain a method of producing the fuel cell separator.

According to one embodiment of the present invention, a fuel cell separator forming part of a unit cell of a fuel cell is provided. The unit cell is formed by interposing an electrolyte electrode assembly between a pair of the fuel cell separators. The electrolyte electrode assembly includes an anode, a cathode, and an electrolyte interposed between the anode and the cathode. A proportion of Cr of an outermost surface of a seal formation region where a seal is provided between the separators or between the separator and the electrolyte electrode assembly is 60% or more.

According to the present invention, the proportion of Cr is determined by the following expression (1).

$$\text{Proportion of Cr (\%)} = 100 \times \text{percentage of Cr} / (\text{percentage of Cr} + \text{percentage of Fe}) \text{ (by weight)} \quad (1)$$

It should be noted that the percentage of Cr or the percentage of Fe (by weight) should be determined by various analyzing devices using techniques such as X-ray photoelectron spectroscopy (XPS).

The "outermost surface" in the present invention is an end surface of the separator where the seals are provided. Constituent elements which exist on the end surface and proportions of the constituent elements are determined by analyzing devices using techniques such as XPS.

The separator having the outermost surface where the proportion of Cr is 60% or more is firmly bonded to the primer as first coating before providing the seals. Stated otherwise, the primer is not separated easily. In the structure, since it becomes extremely difficult for the water vapor to flow between the primer and the separator, formation of blisters is prevented suitably.

In the fuel cell having the fuel cell separator, since it is possible to prevent blisters from being formed in the flow fields for the reactant gases, and it is possible to prevent the flow fields from being narrowed by such blisters. As a result, it is possible to prevent pressure losses in the fuel gas and the oxygen-containing gas flowing through the flow fields.

Preferably, the proportion of Cr in the outermost surface in the seal formation region is 70% or more, and more preferably, 80% or more. In this case, it is possible to further reliably prevent formation of blisters.

Preferably, the proportion of Cr is 90% or less. In this case, the surface layer of the fuel cell separator is dense. As a result, micro-cracks are hardly created on the surface layer. Stated otherwise, the number of micro-cracks produced in the surface layer of the separator is significantly reduced. Since the micro-cracks are starting points of inducing water vapor condensation, by reducing the starting points, possibility of water vapor condensation in the surface layer of the separator is reduced. Thus, formation of blisters is prevented advantageously.

According to another aspect of the present invention, a method of producing a fuel cell separator forming part of a unit cell of a fuel cell is provided. The unit cell is formed by interposing an electrolyte electrode assembly between a pair of the fuel cell separators. The electrolyte electrode assembly includes an anode, a cathode, and an electrolyte interposed between the anode and the cathode. The method comprises the steps of:

heating the fuel cell separator to aggregate Fe in a surface layer of the fuel cell separator to form an Fe rich layer, and providing a Cr rich layer in an inner portion of the fuel cell separator by movement of Fe toward the surface layer, so that the Cr rich layer has a high Cr proportion in comparison with other portions; and applying an electrolytic treatment to the fuel cell separator to remove the Fe rich layer, and expose the Cr rich layer to the outside on a surface of the fuel cell separator.

By adopting these steps, it is possible to easily produce the fuel cell separator having the outermost surface where the proportion of Cr is large in comparison with the proportion of Cr in the inner portion. That is, it is possible to obtain the fuel cell separator in which the primer is firmly bonded, and cannot be separated easily. The water vapor hardly flows between the primer and the separator, and formation of blisters is prevented.

As described above, preferably, the proportion of Cr in the Cr rich layer is 60% or more.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table showing characteristics of separators.

DESCRIPTION OF THE PREFERRED EMBODIMENTS

Hereinafter, a fuel cell separator according to a preferred embodiment of the present invention and a method of producing the fuel cell separator will be described in detail with reference to the drawings.

Figure 1:
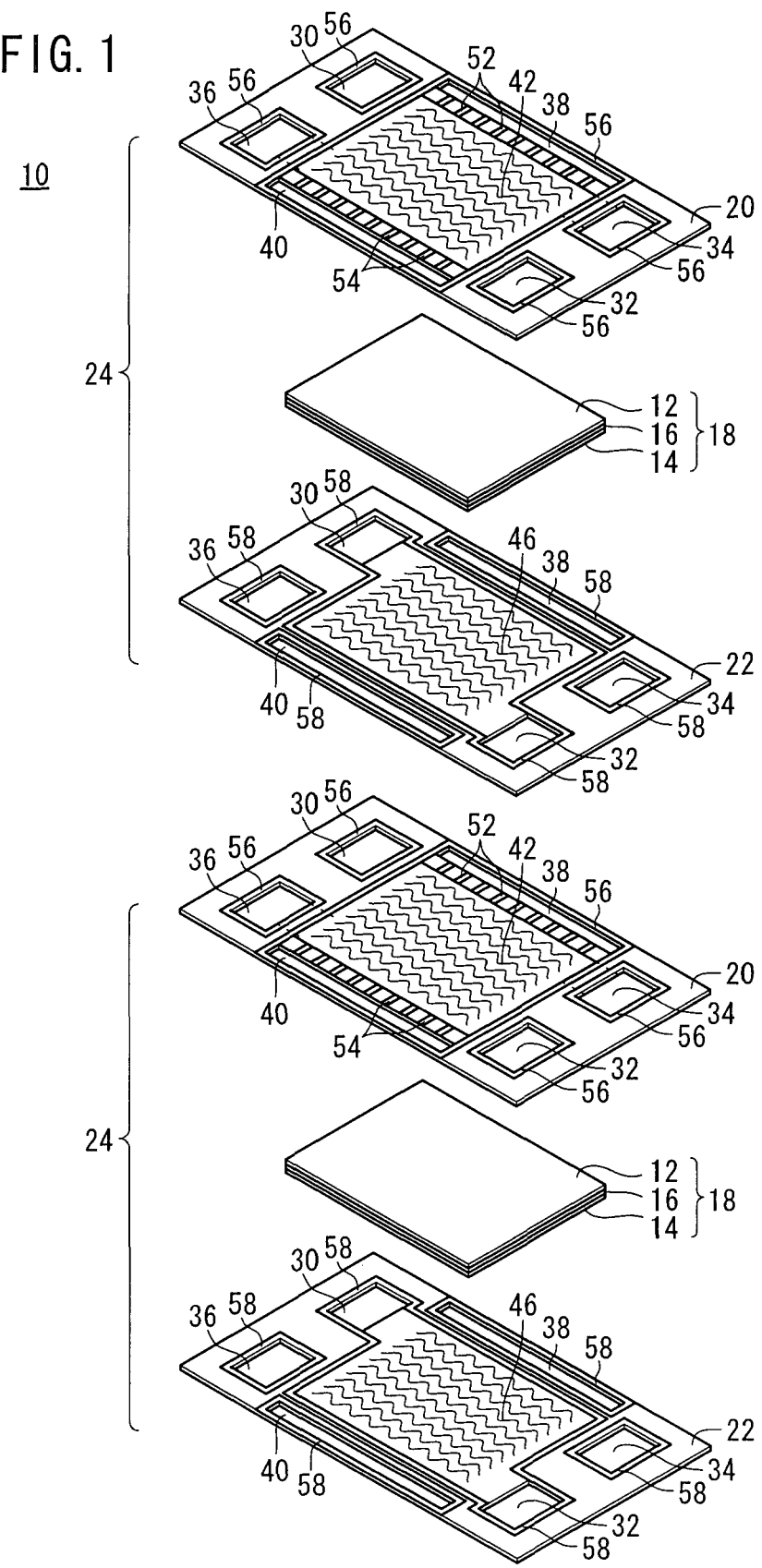
FIG. 1 is an exploded perspective view showing main components of a stack formed by stacking unit cells including fuel cell separators according to an embodiment of the present invention.
Figure 2:
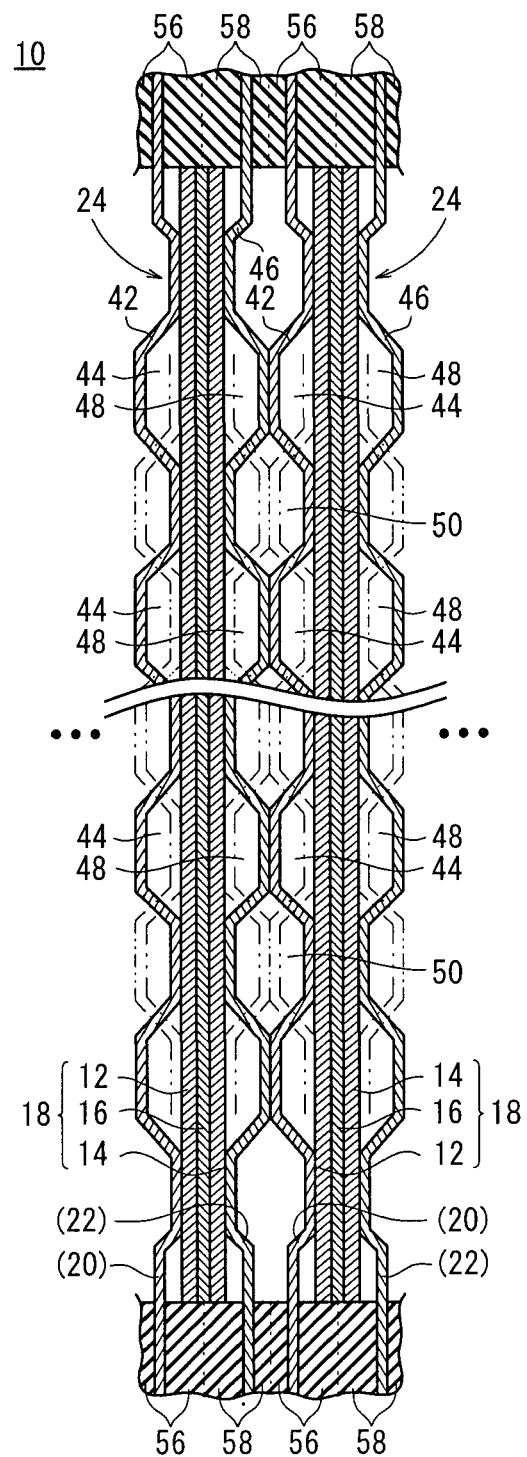
FIG. 2 is a longitudinal cross sectional view showing main components of the stack shown in FIG. 1.

FIGS. 1 and 2 are an exploded perspective view, and a longitudinal cross sectional view showing main components of a stack 10 of a fuel cell according to the embodiment of the present invention.

The stack 10 includes unit cells 24 each formed by sandwiching an electrolyte electrode assembly 18 between a first separator 20 and a second separator 22. The electrolyte electrode assembly 18 includes an anodes 12, a cathode 14, and an electrolyte 16 interposed between the anode 12 and the cathode 14. In the embodiment, the first separator 20 and the second separator 22 are made of stainless steel such as SUS304 (Japanese Industrial Standards (JIS)) or SUS316 (JIS).

Each of the anode 12 and the cathode 14 includes a gas diffusion layer facing the electrolyte 16 and an electrode catalyst layer joined to the gas diffusion layer. Since structure of the anode 12 and the cathode 14 is known, components of the anode 12 and the cathode 14 are not illustrated in the drawings, and detailed description is omitted.

In FIGS. 1 and 2, at each upper left corner of the first separator 20 and the second separator 22, a first gas supply passage 30 as a passage of an oxygen-containing gas is provided. At the diagonally opposite position, i.e., at each lower right corner, a first gas discharge passage 32 as a passage of the oxygen-containing gas after consumption is provided. Likewise, at each upper right corner, a second gas supply passage 34 as a passage of a fuel gas is provided. At the diagonally opposite position, i.e., at each lower left corner, a second gas discharge passage 36 as a passage of the fuel gas after consumption is provided. Further, a coolant supply passage 38 and a coolant discharge passage 40 are provided in the first separator 20 and the second separator 22. The coolant supply passage 38 extends from a position adjacent to the first gas supply passage 30 to a position adjacent to the second gas supply passage 34, and the coolant discharge passage 40 extends from a position adjacent to the second gas discharge passage 36 to a position adjacent to the first gas discharge passage 32.

The first separator 20 has a corrugated fuel gas flow field 42 on a surface facing the anode 12. The fuel gas flow field 42 comprises curved ridges and grooves formed alternately for supplying the fuel gas to the anode 12, and discharging the fuel gas from the anode 12. As shown in FIG. 2, top surfaces of the fuel gas flow field 42 are spaced from the anode 12. In the structure, a hollow space 44 is formed between the fuel gas flow field 42 and the anode 12. The fuel gas flows through the hollow space 44.

The second separator 22 has a corrugated oxygen-containing gas flow field 46 comprising corrugation protruding oppositely from the fuel gas flow field 42 of the first separator 20. Top surfaces of the oxygen-containing gas flow field 46 protrude toward the first separator 20. Thus, the top surfaces are spaced from the cathode 14 to form a hollow space 48 between the oxygen-containing gas flow field 46 and the cathode 14. The oxygen-containing gas flows through the hollow space 48.

Further, since the top surfaces of the fuel gas flow field 42 of the first separator 20 and the top surfaces of the oxygen-containing gas flow field 46 of the second separator 22 protrude oppositely from each other, the top surfaces of the fuel gas flow field 42 and the top surfaces of the oxygen-containing gas flow field 46 are spaced from each other to form a connection channel 50. The coolant flows from the coolant supply passage 38 into the connection channel 50, and then, the coolant flows from the connection channel 50 into the coolant discharge passage 40.

In each of the first separator 20 and the second separator 22, a branch channel 52 branched from the coolant supply passage 38 to the connection channel 50 and a merge channel 54 for merging the coolant from the connection channel 50 into the coolant discharge passage 40 are provided.

On both surfaces of the first separator 20 and the second separator 22, first seals 56 and second seals 58 are provided around the first gas supply passage 30, the first gas discharge passage 32, the second gas supply passage 34, the second gas discharge passage 36, the coolant supply passage 38, the coolant discharge passage 40, the branch channel 52, and the merge channel 54. Preferably, the first seals 56 and the second seals 58 are made of silicone rubber.

Further, primer coating (not shown) is provided between the first separator 20 and the first seals 56, and between the second separator 22 and the second seals 58. In this case, as the primer, silicone resin including silane coupling agent is adopted.

In the structure, the proportion of Cr in the outermost surfaces of the first separator 20 and the second separator 22 is 60% or more. As a result, the primer is firmly bonded to the first separator 20 and the second separator 22 containing the large amount of Cr. Stated otherwise, the primer is not separated from the first separator 20 and the second separator 22 easily. Thus, even if water vapor is produced by operation of the fuel cell, the water vapor hardly flows between the first separator 20 or the second separator 22 and the primer. Thus, formation of blisters can be prevented suitably.

The proportion of Cr as described above can be calculated by dividing the percentage of Cr (by weight) by the sum of the percentage of Cr (by weight) and the percentage of Fe (by weight), and multiplying the resulting value by 100. For example, in the case where 8.3 weight % of Cr and 1.5 weight % of the Fe are contained, the proportion of Cr can be calculated according the above expression (1), i.e., by calculating $100 \times 8.3/(8.3+1.5)=84.7\%$.

It should be noted that the stainless steel contains 15% to 20% of Cr in the material. At the time of producing the separators, normally, a nitric acid passivation treatment or an alkali passivation treatment is performed. At this time, Cr is condensed near the surface. After condensation of Cr, the proportion of Cr as calculated above is approximately 50%. Therefore, the bonding strength of the separator to the primer is small in comparison with the first separator 20 and the second separator 22 according to the present embodiment.

In the first separator 20 and the second separator 22 having a large proportion of Cr according to the present embodiment, it is considered that the primer is firmly bonded to the first and second separators 20, 22 for the following reasons. The silicone rubber of the primer includes S—OH coupling. Through hydrogen coupling, O and H of the S—OH coupling are coupled to O and H of OH physically absorbed to Cr as a constituent element of the first separator 20 and the second separator 22. Cr is an element having a low electronegativity in comparison with Fe, and tends to release electrons relatively easily. Therefore, electrons are supplied to O physically absorbed to Cr. As a result, presumably, hydrogen coupling between O and H of S—OH becomes strong, and primer is not detached from the first separator 20 and the second separator 22 easily.

In operating the fuel cell having the above structure, the temperature of the fuel cell is raised to a predetermined temperature, and then, a fuel gas such as a hydrogen-containing gas is supplied from the second gas supply passage 34 to the anode through the hollow space 44, and an oxygen-containing gas such as the air is supplied from the first gas supply passage 30 to the cathode through the hollow space 48. In the presence of these reactant gases, electrochemical reactions occur at the electrodes 12, 14. In operating the fuel cell, the unit cell 24, i.e., the electrolyte electrode assembly 18, the first separator 20, and the second separator 22 are cooled by a coolant (e.g., cooling water) which is supplied through the coolant supply passage 38 and the branch channel 52, and which flows through the connection channel 50.

The fuel gas and the oxygen-containing gas after consumption are discharged to the outside of the stack 10 through the second gas discharge passage 36 and the first gas discharge passage 32. Further, after the coolant flows from the branch channel 52, and flows through the connection channel 50 to cool the unit cell 24, the coolant is collected into the coolant discharge passage 40 through the merge channel 54. At the end, the coolant is discharged to the outside of the stack 10 through the coolant discharge passage 40.

During operation of the fuel cell, $H_2O$ (chiefly water vapor) is produced by the electrochemical reactions at the electrodes. $H_2O$ flows together with the consumed oxygen-containing gas or the consumed fuel gas, and move to the second gas discharge passage 36 or the first gas discharge passage 32.

The bonding force of each of the first seals 56 and the second seals 58 around the first gas supply passage 30, the first gas discharge passage 32, the second gas supply passage 34, the second gas discharge passage 36 to the primer is extremely large. Therefore, no water vapor flows between the first seal 56 or the second seal 58 and the primer. Since the outermost surfaces of the first separator 20 and the second separator 22 contain a large amount of Cr, the primer is firmly bonded to the first separator 20 and the second separator 22. That is, as described above, the primer is not separated from the first separator 20 and the second separator 22 easily. Thus, even if water vapor is produced by the electrochemical reactions at the electrodes, the water vapor hardly flows between the first separator 20 and the primer and between the second separator 22 and the primer. Thus, formation of blisters can be prevented suitably.

As a result, the water smoothly flows from the first gas supply passage 30 or the second gas supply passage 34 to the first gas discharge passage 32 or the second gas discharge passage 36. Then, the water is discharged to the outside of the stack 10 together with the oxygen-containing gas or the fuel gas.

As described above, in the present embodiment, the water is hardly retained in the first gas discharge passage 32 and the second gas discharge passage 36. Therefore, water vapor does not flow between the first seal 56 or the second seal 58 and the first separator 20 or the second separator 22, and formation of blisters can be prevented. If blisters are formed, the first gas discharge passage 32, the second gas discharge passage 36 (flow passages of the reactant gases) are narrowed, and pressure losses occur in the reactant gases flowing through these passages. In the present embodiment, such problems do not occur.

The first separator 20 and the second separator 22 can be produced as follows.

Firstly, alkali cleaning is applied to the first separator 20 for degreasing. The alkali cleaning should be performed as necessary. If not needed, the alkali cleaning may be omitted.

Next, the first separator 20 is heated. Heating may be carried out by maintaining the temperature of 280° C. for 15 minutes.

By this heating, Fe as the constituent element of the first separator 20 (stainless steel) moves to the outermost surface near the heating source. As a result, an Fe rich layer is formed in the surface layer of the first separator 20. At this time, in accordance with the expression (1), the proportion of Cr in the outermost layer (Fe rich layer) is calculated as approximately 10% to 20%.

On the inner side of the first separator 20, since Fe has moved to the outermost layer, the proportion of Cr is relatively large. That is, on the inner side, a Cr rich layer where the proportion of Cr calculated according to the expression (1) is 60% or more is formed.

Next, an electrolytic treatment is applied to the first separator 20. A solution containing 10% phosphoric acid may be adopted for an electrolytic bath. In this case, the temperature of the electrolytic bath should be about 50° C. and the current density should be about 15 mA/cm$^2$.

By the electrolytic treatment, the Fe rich layer is removed. As a result, the Cr rich layer is exposed. That is, the first separator 20 having the outermost surface layer where the proportion of Cr is 60% or more is obtained.

Thereafter, the primer is applied to the first separator 20, and the primer is baked on the first separator 20. Further, after seal composition is formed by injection molding, the seal composition is hardened by heating.

It is a matter of course that the second separator 22 can be fabricated in the same manner.

In forming the unit cell 24, the electrolyte electrode assembly 18 should be interposed between the first separator 20 and the second separator 22. The stack 10 can be formed by stacking a predetermined number of unit cells 24 together.

Example

Separators were formed using SUS304, and alkali cleaning is applied to the separators. Then, the separators were heated, and an electrolytic treatment was applied to the separators. By adopting various heating conditions and electrolytic treatment conditions, separators having different proportions of Cr in the outermost surface layer were produced. The proportions of Cr in the separators were determined using XPS.

Primer No. 101A/B (silicone rubber/metal adhesive containing silane coupling agent) produced by Shin-Etsu Chemical Co., Ltd. was applied to the separators, and the Primer No. 101A/B was baked on the separators at the temperature of 160° C. for one hour.

Further, injection molding was performed using two-component-hardening-type, addition reaction type dimethyl silicone rubber on the primer, and for preliminary hardening, the temperature of 150° C. was maintained for 40 seconds. Then, hardening was finished by maintaining the temperature of 200° C. for three hours.

Each of the separators having seals provided thereon in the above-mentioned manner were impregnated with 95° C. sulfuric acid aqueous solution of pH2, and for each of the separators, the time period until the seal was peeled off from the separator together with the primer was examined. The separators having the seal which was peeled off in less than 500 hours from the start of impregnation were determined as unacceptable (x), the separators having the seal which was peeled off in the period of 500 to 1000 hours from the start of impregnation were determined as substantially acceptable (Δ), and the separators having the seal which was not peeled off after elapse of 1500 hours or more from the start of impregnation were determined as acceptable (○).

The electrolyte electrode assembly was interposed between the separators to form the stack. The reactant gases are supplied to the fuel cell at the pressure of 150 kPa, at the temperature of 85° C., and at the flow rate of 1 little/minute to operate the fuel cell. The time until blisters were formed in the passages to cause the pressure losses was measured. The separators which do not have pressure losses after elapse of 3000 hours from starting operation were determined as acceptable (○). The separators which have pressure losses before elapse of 3000 hours from starting operation, but the pressure losses were not significant enough to cause practical problems were determined as substantially acceptable (Δ), and the other separators were determined as unacceptable (x).

The above results and proportions of Cr are shown in FIG. 3. As can be seen from FIG. 3, by increasing the proportion of Cr in the outermost surface of the separator to 60% or more, it is possible to ensure that the primer is not detached easily, and formation of blisters is prevented (blister resistance is improved). In particular, in the case where the proportion of Cr is 70% or more, such significant advantages are obtained.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A method of producing a fuel cell separator forming part of a unit cell of a fuel cell, said unit cell being formed by interposing an electrolyte electrode assembly between a pair of the fuel cell separators, said electrolyte electrode assembly including an anode, a cathode, and an electrolyte interposed between said anode and said cathode, the method comprising the steps of:
   heating said fuel cell separator to aggregate Fe in a surface layer of said fuel cell separator to form an Fe rich layer, and providing a Cr rich layer in an inner portion of said fuel cell separator by movement of Fe toward the surface layer, wherein
      said Cr rich layer having a higher Cr proportion by weight with respect to the weight of the Cr and Fe in comparison with other portions and
      the proportion of Cr in said Cr rich layer being 70% or more by weight with respect to the weight of the Cr and Fe; and
   applying an electrolytic treatment to said fuel cell separator to remove said Fe rich layer, and expose said Cr rich layer to the outside on a surface of said fuel cell separator.

2. A production method according to claim 1, wherein said fuel cell separator is made of stainless steel.

* * * * *